Jan. 26, 1926.
G. A. STILL
SPRING TOOTH CULTIVATOR
Filed July 8, 1925
1,571,102
2 Sheets-Sheet 1
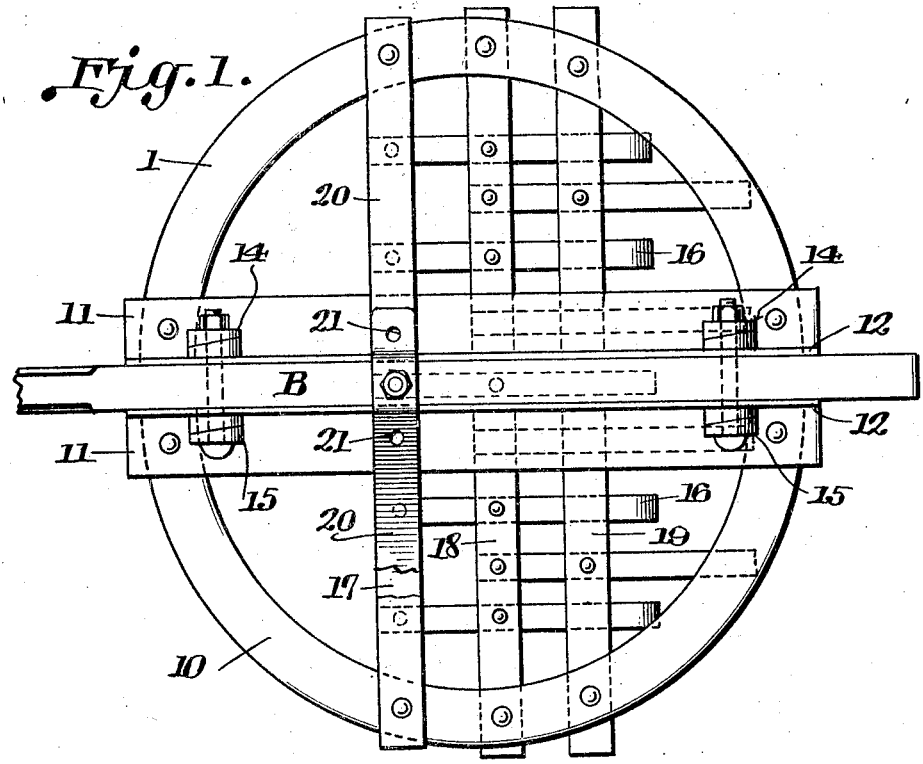
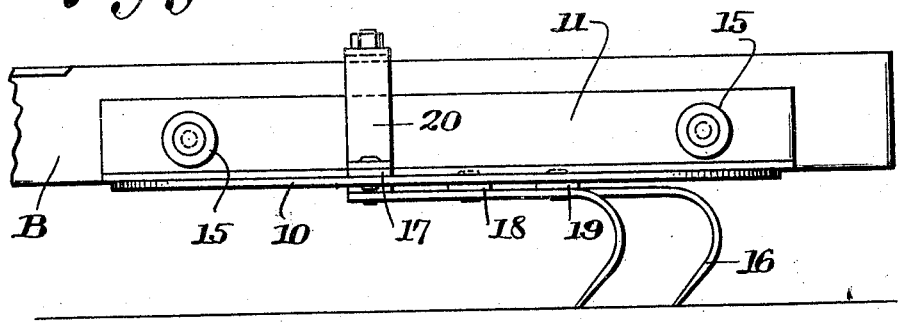
Inventor
George A. Still
By C. A. Snow & Co.
Attorney Jan. 26, 1926. 1,571,102
G. A. STILL
SPRING TOOTH CULTIVATOR
Filed July 8, 1925 2 Sheets-Sheet 2
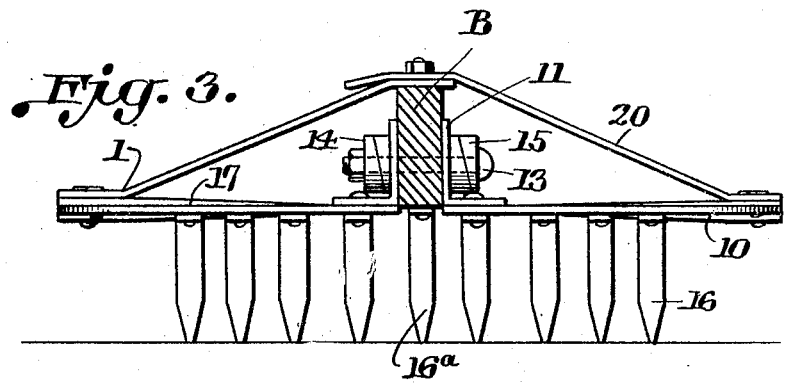
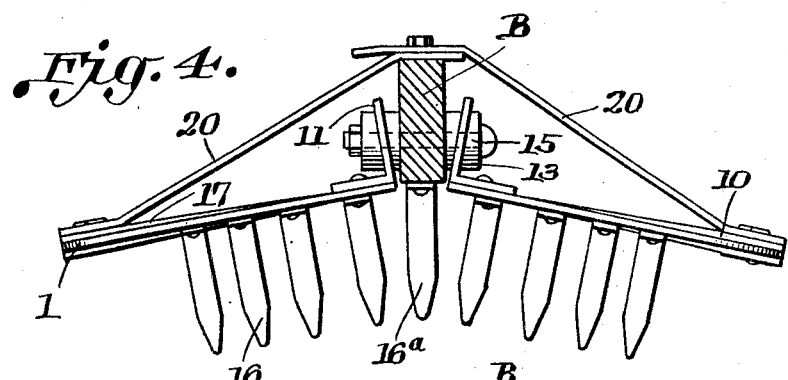
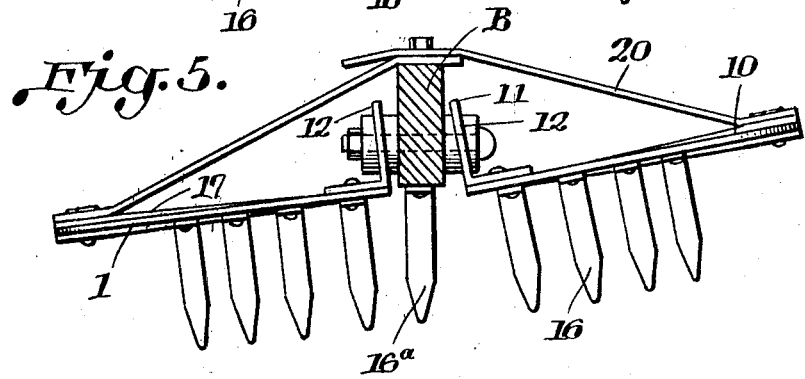
Inventor
George A. Still
By C. A. Snow & Co
Attorney Patented Jan. 26, 1926.

1,571,102

UNITED STATES PATENT OFFICE.

GEORGE ARTHUR STILL, OF CULLMAN, ALABAMA.

SPRING-TOOTH CULTIVATOR.

Application filed July 8, 1925. Serial No. 42,242.

*To all whom it may concern:*

Be it known that I, GEORGE A. STILL, a citizen of the United States, residing at Cullman, in the county of Cullman and State of Alabama, have invented a new and useful Spring-Tooth Cultivator, of which the following is a specification.

The object of the invention is to provide simple and efficient means for supporting and regulating the teeth of a cultivator whereby correct positioning of the teeth in relation to the cultivator body may be obtained.

Another object of the invention is to provide simple and efficient means by which the cultivator teeth may be adjusted laterally and vertically thereby changing the angle at which the blades meet the soil.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 is a top plan view of a cultivator constructed in accordance with this invention;

Figure 2 is a side elevation thereof;

Figure 3 is a transverse section through the cultivator beam showing the teeth of the cultivator arranged uniformly in relation to each other;

Figure 4 is a similar view showing the teeth elevated at the center; and

Figure 5 is a similar view with one section of teeth raised and the other section lowered.

In the embodiment illustrated, a cultivator beam B is shown, the same having semi-circular blade-carrying sections 1 and 10 arranged on opposite sides thereof and secured thereto by means of angle members or bars 11, the upstanding flanges 12 of which are secured to the beam on opposite faces thereof by bolts 13 which carry a pair of beveled washers on each side of the beam, the washers being numbered 14 and 15 respectively. These washers are each beveled transversely, so that each will be thicker at one part than at the diametrically opposite part. When the beveled surfaces of the respective washers 14 and 15 are in contact and the bolt 13 tightened and held by a nut, the respective sections 1 and 10 will be firmly held in any position to which they may have been adjusted. It is apparent that by turning the sections 1 and 10 relatively to the washers 14 and 15 the blades or shovels 16 may be adjusted at any desired angle, the adjustment of said shovels being due to the beveled or wedge-shape of the washers.

In Figure 3, the washers on each side of the beam B are shown with a wide and a narrow portion arranged opposite each other, whereby the sections 1 and 10 are held in transverse alinement, so that the teeth or shovels 16 will engage the earth uniformly.

In Figure 4, the washers 14 and 15 are arranged one on one face of the angle member 11 and one on the other and are so turned that the sections 1 and 10 will be tilted transversely to cause the outer teeth to engage the surface of the ground.

In Figure 5, the washers 14 and 15 are so adjusted relatively to the sections 1 and 10 that the section 10 is tilted transversely and upwardly at its outer edge, so that the inner teeth engage the ground while those on the outer edge do not engage the ground or engage it less deeply.

The semi-circular sections 1 and 10 which are carried by the angle members 11, have their free ends bolted or riveted to said irons so that when combined they form a complete circle as is shown clearly in Figure 1. The sections 1 and 10 are each provided with a plurality of transversely extending longitudinally spaced tooth supporting bars, three of which are here shown and numbered 17, 18 and 19 respectively. These bars 17, 18 and 19 are bolted or riveted to the semicircular sections 1 and 10 and to the angle members 11. As shown, the bars 17 arranged at the front portion of the sections 1 and 10 have their inner ends extended under the angle members and riveted thereto, while their outer ends overlie the curved portion of the frame and are bolted thereto, and the same bolt which connects them with the frame holds the outer ends of braces 20. These braces 20 have their inner ends extended up over the beam B and lapped over each other, the overlapped portions being secured to the beam by bolting or otherwise. As shown, the inner end of the braces 20 are provided with a plurality of longitudinally spaced apertures 21 to provide for their adjustment, which is necessary when the sections are raised or lowered.

The bars 17, 18 and 19 carry on their lower faces the aforesaid cultivator shovels 16, the shanks of which are secured to said bars by bolting, riveting or otherwise. The shovels 16 are preferably made of spring steel, with their surface-engaging ends bent into hook-shaped form and pointed to cause them to scratch or loosen the earth.

A large tooth 16ª is carried by the lower face of the cultivator beam B and the teeth of the respective bars are so arranged as to be staggered in relation to each other as is shown clearly in Figure 1.

In use of this cultivator, the parts being in the position shown in Figures 1 and 3, when it is desired to vary the angle of the teeth in relation to the earth, the desired section may be changed by loosening the bolt 13, and then adjusting the washers 14—15 on said bolt to position the section at the proper angle. The bolts are then again tightened and secured whereby the section is held in the desired adjusted position.

I claim:—

1. The combination with a cultivator beam, of angle members bolted to opposite faces of said beam, semi-circular tooth carrying frames secured at their ends to the laterally extending parts of the angle members, and means for adjusting the position of the angle members relatively to the beam for varying the angular adjustment of the teeth carried by the frames.

2. In a cultivator, a beam, an angle member secured to one face thereof, a tooth carrying frame secured to the laterally extending part of the angle member, and means for varying the adjustment of said angle member relatively to said beam for adjusting the position of the teeth carried by said frames.

3. In a cultivator, a beam, angle members mounted on opposite faces of said beam and adjustably secured in relation thereto, tooth carrying sections secured to said angle members, braces connecting said sections with said beam, and beveled washers connected with the angle members for varying their relation to the beam and changing the adjustment of the teeth of the sections.

In testimony that I claim the foregoing as my own, I have hereto affixed my signature

GEORGE ARTHUR STILL.